United States Patent [19]

Boysen et al.

[11] 3,740,546

[45] June 19, 1973

[54] PILOT LIGHT ASSEMBLY FOR CIRCUIT CARD MOUNTING DEVICE

[75] Inventors: Gerd C. Boysen, Milwaukee; Lawrence F. Freitag, Bayside, both of Wis.

[73] Assignee: Allen Bradley Company, Milwaukee, Wis.

[22] Filed: Oct. 4, 1971

[21] Appl. No.: 186,114

[52] U.S. Cl. ............ 240/52.1, 240/2.18, 240/8.16, 339/17 D, 340/381

[51] Int. Cl. ............ F21v 21/08

[58] Field of Search ............ 240/52.1, 2.18, 8.16; 339/17 D; 340/381

[56] References Cited

UNITED STATES PATENTS

| | | | |
|---|---|---|---|
| 1,905,843 | 4/1933 | Foulke | 240/8.16 X |
| 3,516,087 | 6/1970 | Rueger | 240/8.16 X |
| 3,544,950 | 12/1970 | Lopez | 339/17 D |
| 3,393,398 | 7/1968 | Gardner | 240/8.16 X |
| 3,611,360 | 10/1971 | Bailey | 240/52.1 X |
| 2,998,597 | 8/1961 | Edwards | 240/52.1 X |

OTHER PUBLICATIONS

Advertisement Entitled "Brite-Eye" be35m of the Cal-Glo Company, El Segundo, Cal. 10-64.

*Primary Examiner*—Samuel S. Matthews
*Assistant Examiner*—Monroe H. Hayes
*Attorney*—Arthur H. Seidel and Allan W. Leiser

[57] ABSTRACT

A pilot light assembly for a circuit card enclosure having a cover into which the card is inserted for retention therein, which cover has an inner tier of light receptacles adjacent one another in a front corner. The circuit card has several pairs of terminal pads disposed on one end, which pads are electrically connected to key circuit points on the card. A plurality of pilot light units are insertable into the light receptacles through apertures in a front wall of the cover, and a pair of fingers extend from each light unit to slidably engage one pair of the terminal pads on the circuit card to complete an electrical circuit between the light unit and a circuit card monitor point.

6 Claims, 6 Drawing Figures

Patented June 19, 1973 3,740,546

2 Sheets-Sheet 1

INVENTORS
GERD C. BOYSEN
LAWRENCE F. FREITAG
BY
Arthur H. Seidel
ATTORNEY

INVENTORS
GERD C. BOYSEN
LAWRENCE F. FREITAG
BY
Arthur H. Seidel
ATTORNEY

PILOT LIGHT ASSEMBLY FOR CIRCUIT CARD MOUNTING DEVICE

BACKGROUND OF THE INVENTION

Electric pilot lights that are connected to plug-in circuit cards mounted in a circuit card mounting device have proved extremely useful for monitoring the state of circuits contained on such cards and visually indicate particular circuit information, for example, the absence of voltage or current at a particular point in the circuit. However, there are two major disadvantages with such pilot lights in that they are relatively expensive and require a certain number of interconnections to the circuits they monitor. Because of these interconnections it is advantageous to be able to purchase or construct electronic circuit cards with pilot lights preconnected thereto. But it is not always possible, economically or otherwise, to have preconnected pilot lights that will monitor all the critical points in the circuits of one's installation. Although it is possible to determine certain key points that might prove useful to monitor, often the critical points that are most advantageous to monitor for one's particular installation cannot be determined until the circuit card has been in actual use. For this reason, many users of pilot lights wait until their circuit cards have been in use long enough to determine the critical monitor points. Once these points are determined, the pilot lights are then connected to the cards. The primary problem with this procedure is that modifications must be made in the cards to connect the lights, and they normally must be electrically unplugged and removed from their mounting enclosure while these connections are constructed. This is especially true when the circuit cards are separately mounted inside enclosure covers. The necessity of having to unplug a card to make such modifications may be highly undesirable in certain installations. Consequently, neither of the above described methods of connecting the pilot lights is entirely satisfactory for a circuit card mounting enclosure.

In the past, there has been no pilot light assembly available that significantly presents a solution to the above named problems in spite of the fact that a variety of light assemblies with preconnected pilot light circuits have been employed to reduce the amount of circuit card modifications that must be performed. Once such device includes an enclosure cover for the circuit card with pre-stamped holes in which the pilot lights may be mounted. However, to mount the pilot lights in the cover holes it is necessary to remove the card from the cover and electrically disconnect the card. Thus, the problem of a lack of satisfactory pilot light assembly for a circuit card mounting enclosure remains.

SUMMARY OF THE INVENTION

The present invention resides in a pilot light assembly for a circuit card mounting enclosure having a cover with an open rear through which a circuit card member is inserted. The circuit card member is secured inside the cover and a plurality of light holding cartridge members are translatable through apertures in the front wall of the cover into light receptacles disposed in the inside of the cover. As the light holding cartridge members are translated into the light receptacles, electrical connecting means associated with the cartridge members and the circuit card member electrically connect the first member into key monitor circuit points on the second member.

It is a principal object of the invention to provide a pilot light assembly with a circuit card having a number of printed terminal pads connected to critical points of the circuits contained on the circuit card.

A further object of the invention is to provide a pilot light assembly having an enclosure cover that readily accepts a circuit card through an open end and a plurality of light units through apertures in an opposite end, and with guide means for guiding and positioning the circuit card in addition to a plurality of housing receptacles in which the light units are received.

It is another object of the invention to provide a pilot light assembly having a plurality of light units translatable into receptacles in an enclosure cover, which light units include a light bulb slidably inserted into a cartridge like bulb socket, and with fingers extending from one end of the bulb socket to engage terminal pads of a circuit card as the light unit is translated into the cover. Such structure thereby allows for electrical connection of the light units to the circuit card without necessitating removal of the card from the enclosure cover or the electrical unplugging of the card.

The foregoing and other objects and advantages of the invention will appear from the following description. In the description reference is made to the accompanying drawings, which form a part hereof, and in which there is shown by way of illustration, and not of limitation, a specific form in which the invention may be embodied. Such embodiment does not represent the full scope of the invention, but rather the invention may be employed in a variety of embodiments, and reference is made to the claims herein for interpreting the breadth of the invention.

DESCRIPTION OF THE PREFERRED EMBODIMENTS

Figures 1, 2, 3:
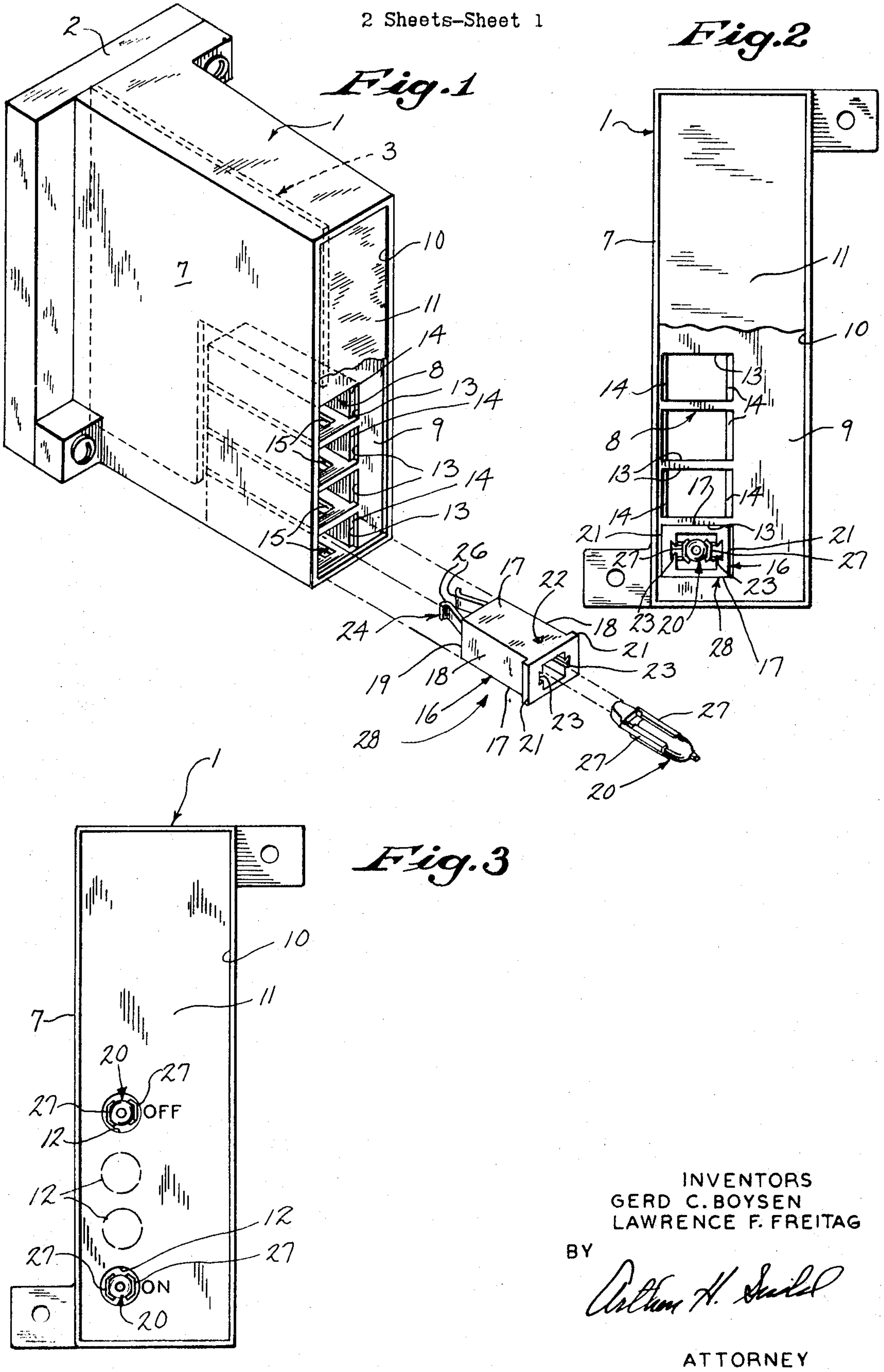
FIG. 1 is a partially exploded view in perspective of a pilot light assembly for a circuit card embodying the invention and attached to a supporting base, with an identification plate broken away to shown interior construction.
FIG. 2 is a front view of a cover forming part of the pilot light assembly of FIG. 1 and into which a light unit has been inserted, as occurs when the parts are assembled.
FIG. 3 is a front view similar to FIG. 2, but with the entire identification plate disposed on the cover front end.

Referring now to the drawings, FIG. 1 shows in perspective a rectangularly shaped cover 1, mounted on a base 2, that functions to receive and house a thin printed circuit card 3 which is shown in dotted outline. Such a printed circuit card 3 supports a group of electrical circuit components, which are not shown, and has circuit wiring affixed to its surface for connecting these components with another. Such circuit components and wiring form an electrical subcircuit to which electrical connections are made at the rear of the card 3, where it is adjacent the base 2. The manner of card construction, and the making of electrical connections therewith, are not a part of the present invention, and the reader is referred to co-pending application Ser. No. 162,880 filed July 15, 1971 for details of one manner of making connections to a card and of mounting a card and cover upon a base.

Figure 5:
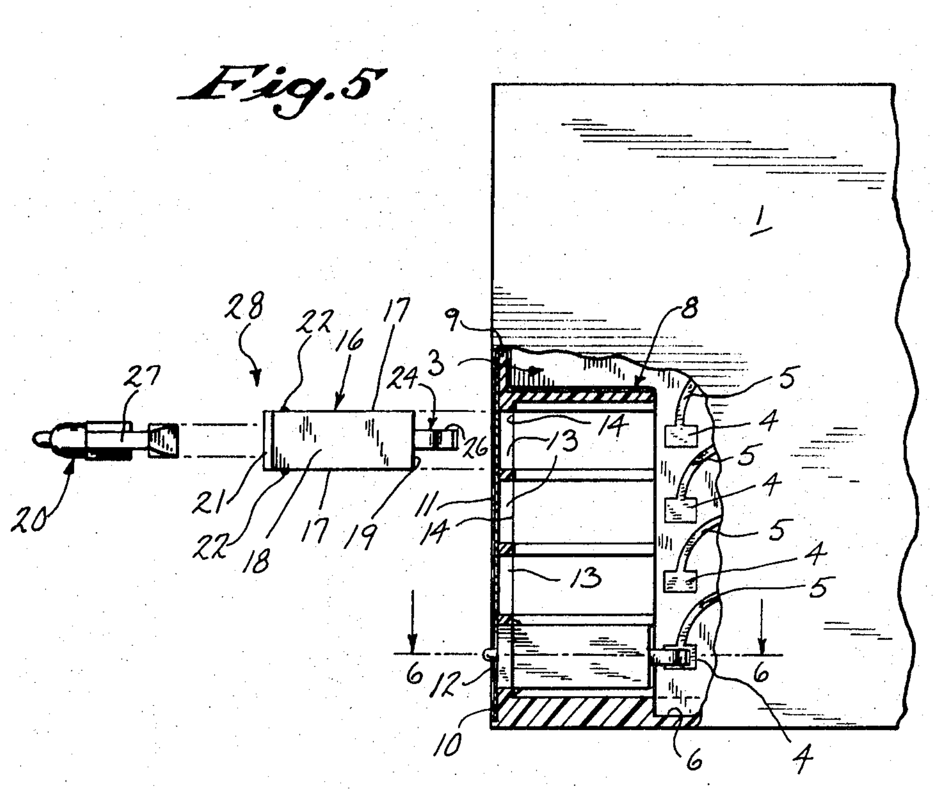
FIG. 5 is a partially exploded fragmentary side view of the pilot light assembly of FIG. 1 with parts broken away to show interior construction.

The present invention is concerned with attaching pilot lights into the circuit of the card 3, and for this purpose the circuit has a group of terminal pads 4 located toward the front of the card 3, as shown in FIG. 5.

Figure 6:
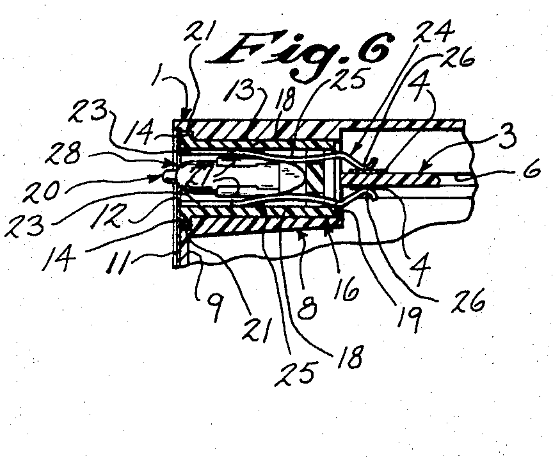
FIG. 6 is a fragmentary view in section of FIG. 5 taken though the plane 6—6.

As indicated in FIG. 6, the pads 4 are formed in pairs on both faces of the card 3, and these pads 4 are connected by conductive tracks 5 into the circuit on the card 3 at key monitor points where pilot light indication may be of value in diagnosing circuit operation, or circuit malfunctions. Together, the conductive tracks 5 and the terminal pads 4 comprise circuit contact means and for purposes of disclosure herein, it suffices to show the pads 4 with the conductive tracks 5 extending from each, as represented in FIG. 5, for the reason the rest of the circuit card construction can be of usual form.

Figure 4:
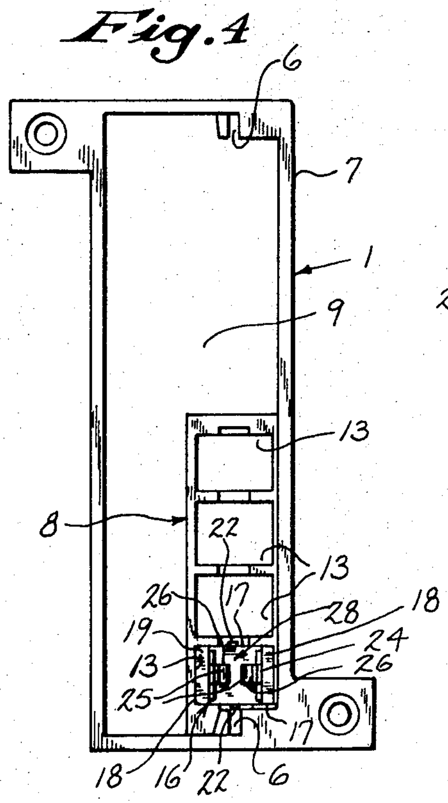
FIG. 4 is a rear view looking into the cover shown in FIG. 2.

FIG. 4, which is a view from the open rear of the cover 1, with the circuit card 3 removed, shows a pair of inner guide grooves 6 in the top and bottom of the cover 1 and into which the circuit card 3 is slid. These grooves 6 are close to the right side 7 of the cover 1, as viewed looking forward from the rear of the cover, and in vertical alignment with the grooves 6 is a set of four light receptacles 8 that are integrally molded into the cover 1. The four receptacles 8 are tiered one above the other, directly behind a front wall 9 that encloses the front of the cover 1. The front wall 9 is stepped a slight distance from the forwardmost extent of the cover 1 to form a shallow recess 10. A thin identification plate 11 lies in the shallow recess 10, as most clearly shown in FIGS. 3 and 5. The upper portion of this identification plate 11 is also shown in FIGS. 1, 2, and 6. The plate 11 has the outline of four pre-stamped sightholes 12 which may readily be punched out and the purpose of the plate will be more fully discussed hereinafter.

Each light receptacle 8 is of an elongate, box-like configuration that is enclosed on its two sides. THe uppermost receptacle 8 is closed at its top, and the lowermost is closed along its bottom. The front of each receptacle 8 is open, with an aperture 13 extending through the cover front wall 9 which has a pair of narrow notches 14 on two opposite sides of the aperture 13. The rear of each receptacle 8 is open, and the terminal pads 4 of the circuit card 3 are immediately behind and centered with the rear, open ends of the receptacles 8. Each receptacle 8 has channels 15 in its floor and ceiling, which commence a short distance back from the front aperture 13. As seen in FIG. 5, these channels 15 comprise slits extending completely through the walls that are common to two adjacent receptacles 8.

The receptacles 8 are adapted to receive small rectangular, box-like, light holding cartridges 16 that function as light sockets. One such cartridge is shown in perspective in FIG. 1 in alignment with the lowermost receptacle 8, and in FIGS. 2, 4, 5 and 6 such cartridge 16 is shown installed within the lowermost receptacle 8. Another cartridge 16 is shown in FIG. 5 in a position preliminary to insertion in the uppermost receptacle 8, and it is to be understood that the cartridges 16 are interchangeable in the receptacles 8.

Each cartridge 16 has identical top and bottom walls 17, like side walls 18, and a rear wall 19. The front of each cartridge 16 is open to receive a torpedo type light bulb 20. Each side wall 18 terminates in a lip 21 at its front end, and integrally protruding from the top and bottom walls 17 are a pair of tiny nodes 22 near the cartridge front end. Molded in opposed side walls of the bulb opening are a pair of lengthwise grooves 23.

Referring again to FIG. 6, the rear wall 19 of the cartridge 16 is molded around a pair of resilient, metallic, conductive elements 24. Bow shaped bulb engaging contact portions 25 form the front part of the elements 24 and lie in the grooves 23. Spring contact fingers 26 form the rear part of the elements 24 and emerge from the rear wall 19 of the cartridge 16. The contact fingers 26 slant rearward and inward toward one another to present a stab type connection that pinches tightly on the terminal pads 4 of the circuit card 3. The bulb engaging contact portions 25 are positioned in the slots 23 to engage side rail conductors 27 on a bulb 20 to electrically connected the bulb 20 to the conductive elements 24 when it is fully inserted in the cartridge 16. When the bulb 20 is inserted in the cartridge 16 the portions 25 are sprung apart, and due to the configuration of the resilient elements 24 this results in a pivoting of the finger portions 26 toward one another, to enhance the ability to tightly engage terminal pads 4. Together, a cartridge 16 with its associated bulb 20 comprise a light unit 28.

With the above structure in mind, the manner in which the components of the pilot light assembly are assembled in a mounting enclosure for the circuit card 3 will now be described.

First, the card 3 is positioned in the guide grooves 6 and inserted into the cover 1 to a homed position. Thereafter, the card 3 and its cover 1 are attached to the base 2, and together the cover 1 and the base 2 completely enclose the card 3. If there is no immediate need for monitoring of the key monitor points on the circuit card 3 this completes the assembly. Although no light units 28 are yet installed in the mounting enclosure, the insertion of the light units 28 in the cover 1 is a separate operation that does not have to be performed until there is a need for circuit monitoring.

To install a light unit 28 in the cover 1, the identification plate 11 must be removed. The plate 11 has an adhesive back for releasable attachment to the cover 1. Thus, the plate may be readily removed from the cover 1 to provide access to the light receptacles 8 via the cover apertures 13. Thereupon, one or all four of the light units 28 may be installed as needed depending on how many of the key circuit points are desired to be monitored. For brevity, only the actual installation of one light unit 28 will be described.

Insertion of a light unit 28 is readily performed by positioning it in front of a cover aperture 13 as shown in FIG. 1. The light unit 28 is then translated in a rearward direction to pass endwise through the apertures 13 and slidably enter into the housing receptacle 8 to which the aperture 13 opens. During this translation the light unit 28 interfits with the receptacle 8 in a tightly held engagement.

As the light unit 28 moves toward a homed position in the receptacle 8, the contact fingers 26 of the conductive elements 24 slidably engage the front end of the card 3. The fingers 26 are aligned with respect to the card 3, so that the front edge of the card 3 slides between the fingers 26 and forces them apart. The fingers 25 attempt to regain their normal position, thereby pressing tightly against the terminal pads 4 at the front end of the circuit card 3. As shown in FIG. 6 the fingers 26 mirror one another and their ends are arcuately shaped in order that they will not snag the card 3 and impede the making of an electrical connection. In this way, the conductive elements 24 are electrically connected to the pair of terminal pads 4 which are in turn connected to a key monitoring point on the card 3. By properly inserting the light unit 28 into the appropriate receptacle 8, any one of the key monitor points may be connected to the light unit 28. As the light unit 28 is homed, the nodes 22 which act as catch means are positioned into the channels 15 to thereafter prevent the light unit 28 from sliding out the front end of the receptacle 8. The frontal lips 21 of the cartridge fit into the notches 14 of the frontal wall 9 to serve as stop means preventing the light unit 28 from sliding out the rear of the receptacle 8. With the light unit 28 thus inserted in the receptacle 8, the light unit 28 is now ready to begin indicating the state of the circuit monitor point to which it is electrically connected.

To complete the assembly the identification plate 11, with an appropriate pre-stamped sighthole 12 punched out, to expose the bulb 20 in the installed light unit 28, is reattached to the front wall 9 of the cover 1. The plate 11 as shown in FIG. 3 has two such sightholes 12 punched out and labeled to indicate the function of their corresponding pilot lights.

As indicated by the above assembly description, when a light unit 28 is desired to be installed in the present invention the design of the light assembly allows one or all four of the light units 28 to be physically inserted into a homed position inside the cover 1 and electrically connected to the particular critical circuit points to be monitored without having to unplug the circuit card 3 at any time. The light units 28 do not have to be purchased until there is a need to monitor one of the critical circuit points and if such a need does not arise, no light units 28 must ever be purchased.

By constructing the circuit card 3 with the terminal pads 4 preconnected to the key circuit points through the conductive tracks 5 to form circuit contact means, the electrical circuitry between the light units 28 and the critical circuit points to be monitored is readily completed by engagement of the conductive elements 24 with the circuit contact means. Hence, the circuit contact means and the conductive elements provide a connecting means that does not require soldering or other types of positive engagement to form a dependable connection between the circuit card and the light units. To construct the circuit card 3 with the key circuit points preconnected to the pads 4 adds very little to the cost of a card, hence, the major cost of the pilot light assembly, the light units, is avoided until needed. Thus, it can readily be seen that the disclosed structure provides a pilot light assembly that is easily installed to monitor a particular point in a circuit when necessary, but yet is initially relatively inexpensive, and increases in cost thereafter are directly keyed to the need for additional light units and not before that need arises.

We claim:

1. In a pilot light assembly for a circuit card member the combination comprising:

a cover that receives the circuit card member;

a plurality of receptacles formed in said cover, each having an elongate interior with an opening at the front of the cover and an opening at the opposite end which opens upon a portion of the circuit card member;

a light holding cartridge member translatable into the receptacles of said cover through one of said front openings conforming with the interior of and residing in a selected one of said receptacles;

electrical connecting means associated with the light holding cartridge member and the circuit card member comprising conductive elements with stab-type connection fingers extending from one of the members and circuit contact means on the other member aligned in such fashion that as the light holding cartridge member is translated into the cover receptacle, the circuit contact means and conductive elements engage one another to electrically connect the light holding cartridge member to the circuit card member; and illumination bulbs insertable in said cartridge member and with conductors to electrically engage the part of said electrical connecting means located in said cartridge member.

2. The combination of claim 1 in which:

the conductive elements are formed of a pair of flexible, metallic elements that lie within and extend from the light holding cartridge member; and the circuit contact means comprises a plurality of printed terminal pads affixed to the front end of said circuit card and a plurality of conductive tracks connecting several points of the electrical circuit on said circuit card to the terminal pads.

3. The combination of claim 2 in which the light receptacles have their open rears in alignment with an edge of the circuit card when said card is received within the cover.

4. In a pilot light assembly for a circuit card the combination comprising:

a rectangular cover with a front wall and sides that houses the circuit card;

a plurality of hollow receptacles each having an elongate interior formed in said cover one above the other, each with an opening in the front wall of the cover and having an open rear facing a circuit card edge;

a plurality of elongate light bulb holding cartridge members that are translatable into the cover through said openings in the front wall to interfit with and reside in said hollow receptacles;

a plurality of pairs of terminal pads affixed on the circuit card at the edge faced by the open rear of the receptacles; and conductive elements mounted in each of said cartridges having light bulb engaging contact portions alongside inner walls of the respective cartridges and having spring contact fingers emerging from the rear of the cartridges and engaging the circuit card terminal pads.

5. In a pilot light assembly for a circuit card the combination comprising:

a cover that receives the circuit card;

a plurality of elongate receptacles formed in said cover, each with a first opening at the front of the cover and a second opening at its rear, such second opening being in alignment with an edge of the circuit card when the card is received within said cover;

a plurality of light holding cartridges disposable within said elongate receptacles by insertion through said first openings;

stop means associated with said receptacles and said cartridges limiting the distance of insertion of a cartridge into a receptacle;

catch means associated with said receptacles and said cartridges retaining a cartridge within a receptacle when inserted therein;

conductive elements mounted in each of said cartridges having bulb engaging contact portions alongside inner walls of the cartridge, and having spring contact fingers emerging from the rear of the cartridge, such contact fingers engaging the circuit card and said bulb engaging contact portions being sprung when engaged by a bulb to pivot the contact fingers toward one another to tighten the engagement with the circuit card.

6. In a pilot light assembly for a circuit card the combination comprising:

a cover with a front wall and sides that houses the circuit card;

a plurality of elongate receptacles formed in said cover one above the other, each with a first opening at the front of the cover and a second opening at its rear, such second opening being in alignment with an edge of the circuit card when the card is received within said cover;

a plurality of light holding cartridges disposable within said elongate receptacles by insertion through said first opening;

stop means associated with said receptacles and said cartridges limiting the distance of insertion of a cartridge into a receptacle;

catch means associated with said receptacles and said cartridges retaining a cartridge within a receptacle when inserted therein;

a plurality of pairs of terminal pads on the circuit card;

conductive elements with each of said cartridges having bulb engaging contact portions alongside inner walls of the cartridge, and having spring contact fingers emerging from the rear of the cartridge to slant rearward and inward toward one another, such contact fingers engaging a pair of said terminal pads on the circuit card to electrically connect said light holding cartridge members to the circuit card; and illumination bulbs insertable in said cartridges and with conductors that engage said bulb engaging contact portions of said conductive elements and spring them apart, pivoting the contact fingers to tighten the engagement of said fingers with the circuit card.

* * * * *